United States Patent Office 3,701,809
Patented Oct. 31, 1972

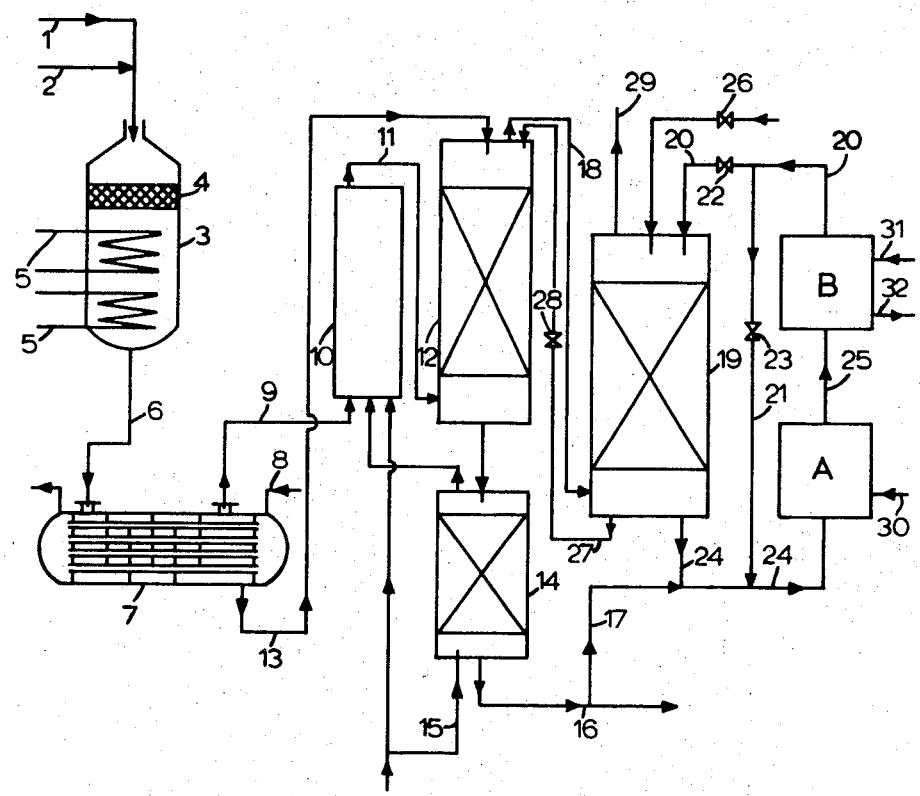

3,701,809
CYCLIC PROCESS FOR THE PREPARATION OF AN OXIME FROM A HYDROXYLAMMONIUM SALT SOLUTION
Abraham H. de Rooij, Geleen, and Ferdinand J. G. Kwanten, Sittard, Netherlands, assignors to Stamicarbon N.V., Heerlen, Netherlands
Filed Nov. 12, 1969, Ser. No. 875,723
Claims priority, application Netherlands, Nov. 12, 1968, 6816075
Int. Cl. C07c *131/00;* C01c *1/28;* C01b *21/00*
U.S. Cl. 260—566 A  1 Claim

ABSTRACT OF THE DISCLOSURE

A cyclic process in which an aqueous acid reaction mixture is kept in circulation between a zone for the synthesis of hydroxylamine and a zone for the synthesis of oxime. Nitric acid is continuously added to the circulating liquid, the nitrate ions being catalytically reduced with $H_2$ to form $NH_2OH$ and some $NH_3$ as by-product. The $NH_2OH$ is consumed in oxime synthesis zone and the $NH_3$ by-product is continuously removed by contacting the circulating liquid with a mixture containing NO and $NO_2$ under such conditions that $N_2$ and $H_2O$ result.

---

The invention relates to an improvement of a cyclic process for the preparation and processing of a hydroxylammonium salt solution.

As is known, an important use to which hydroxylammonium salts are put is the preparation of oximes from ketones, in particular the preparation of cyclohexanone oxime from cyclohexanone. In a known cyclic process for such a preparation an aqueous acid and buffered reaction medium containing buffer acids or salts can be considered as acids, such as phosphoric acid and bisulphate resp., and salts derived from these acids, is kept in circulation through a zone for the synthesis of hydroxylammonium salt, in which zone nitrate ions are catalytically reduced to hydroxylamine by means of molecular $H_2$, and through a zone in which oxime is synthesized. Before this circulating aqueous reaction medium is fed into the zone for the synthesis of the hydroxylammonium salt, the nitrate ions consumed are supplemented, generally by means of nitric acid of approximately 60% by weight concentration.

The hydroxylamine thus formed combines with free buffer acid present to form the corresponding hydroxylammonium salt, and the resulting solution containing hydroxylammonium salt is fed into the oximation zone, where the hydroxylammonium salt is reacted with e.g. a ketone to form the corresponding oxime with release of free acid. After removal of the oxime from the aqueous reaction medium, the latter is fed back into the zone where the hydroxylammonium salt is synthesized.

The chemical reactions taking place in the successive process steps can be rendered by the following equations, which are meant as an example:

(1) Formation of hydroxylammonium salt:

$$2H_3PO_4 + NO_3^- + 3H_2 \rightarrow NH_3OH^+ + 2H_2PO_4^- + 2H_2O$$

(2) Rearrangement to oxime (using e.g. cyclohexanone)

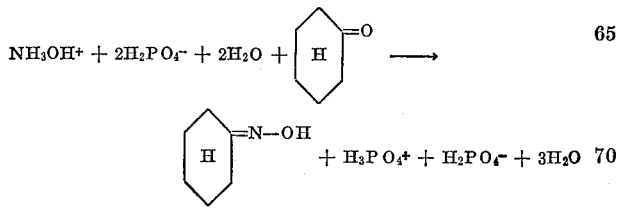

(3) Addition of $HNO_3$, to make up for consumption of nitrate ions, after removal of the oxime formed:

$$H_3PO_4 + H_2PO_4^- + 3H_2O + HNO_3 \rightarrow$$
$$2H_3PO_4 + NO_3^- + 3H_2O$$

The solution present after this addition of $HNO_3$ will—following removal of both the water formed in the reaction and the water introduced with the nitric acid supplied—in theory have the same composition as the starting solution used for the formation of the hydroxylammonium salt.

It is known, however, that catalytic reduction of nitrate ions by means of molecular hydrogen not only gives rise to formation of hydroxylamine but—depending on the reaction conditions—also causes 5–20% of the nitrate ions present to be reduced to ammonia. Consequently, a continuous process in which an aqueous acid reaction medium is kept in circulation between a zone for the synthesis of hydroxylamine and a zone for the synthesis of oxime, involves the risk that, owing to this reduction of nitrate ions to ammonia, the reaction medium will get ever more enriched in ammonia.

However, a proper course of the chemical processes involved requires that the composition of the reaction medium kept in circulation change as little as possible, so that measures must be taken for the periodic or continuous removal of the ammonia formed, e.g. by withdrawal of a portion of the circulated reaction medium, followed by evaporation and crystallization of ammonium salt, and feed-back of the parent liquor after recovery of the ammonium salt.

The process according to the present invention provides an improvement which consists in that the laborious evaporation and removal of crystallized ammonium salt is cut out, because, according to the invention, the cyclic process makes use of the reaction between nitrous gases and ammonium ions with simultaneous formation of nitrogen in conformity with the equation:

$$2NH_4^+ + NO + NO_2 \rightarrow 2N_2\uparrow + 3H_2O + 2H^+$$

This means that according to the invention the circulated aqueous reaction medium, or part thereof, is brought into contact with nitrous gases under such conditions that the ammonium ions to be removed are broken down to nitrogen. In particular, the breakdown of $NH_4^+$ to $N_2$ is dependent on the temperature. It is true that the rate of breakdown is also influenced by the $NH_4^+$ concentration and the pH, but in an acid reaction medium it is the temperature that constitutes the principal rate-determining factor. Below 20° C. there is hardly any breakdown, but as soon as the temperature is increased to above 40° C. the reaction starts going at a fairly fast rate.

In the present cyclic process, in which, on the one hand, ammonium ions present in the circulated reaction medium must be broken down to nitrogen through contact with nitrous gases, and, on the other, nitric acid must be fed into the circulated reaction medium to serve as a source for the formation of hydroxylammonium salt, it is advantageous now to use the reaction medium as an absorption liquor for nitrous gases in the end-absorption stage of a nitric acid plant.

It is well known that in the preparation of nitric acid, nitrogen, oxide is formed by combustion of ammonia; this nitrogen oxide is subsequently oxidized with air to yield nitrogen dioxide, which is subsequently absorbed in water, or dilute nitric acid, in a number of stages, with intermediate oxidation of nitrogen monoxide and/or nitrogen dioxide formed, which process is described by the reaction equations $$3NO_2 + H_2O \rightarrow 2HNO_3 + NO\uparrow$$

$$2NO + O_2 \rightarrow 2NO_2$$

It is known from practice that ¾ of the NO formed by combustion of $NH_3$ can be readily oxidized to $NO_2$, which is rapidly absorbed, but that oxidation and absorption of the remaining ¼ part requires a relatively large oxidation space and absorption space.

Absorption of this balance of nitrous gases in the circulated aqueous acid reaction medium with the object of removing $NH_4^+$ ions formed by reduction of nitrate, offers an economically attractive combination of the nitric acid production with the hydroxylamine synthesis, partly because any nitrous gases that have escaped the breakdown reaction

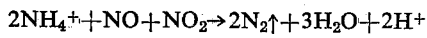

get bound to nitric acid and thus find useful application in the reaction medium. To make this absorption of nitrous gases in the circulated liquid with attendant formation of nitric acid proceed smoothly, the temperature in the absorption system is not allowed to rise to above 80° C. because, otherwise, too much of the nitrous gases would remain unabsorbed. In other words, the lower temperature limit is defined by the breakdown reaction of the $NH_4^+$, which proceeds smoothly at a temperature not lower than 50° C., while the upper limit is defined by the absorption of nitrous gases, which means that it must not be higher than 80° C.

A way in which this combination of processes can be realized is diagrammatically illustrated in the figure. The nitric acid plant is represented by ammonia combustion vessel 3, provided with platinum gauze 4 and steam pipes 5, in which the heat released is utilized for generation of steam, hot-gas condenser 7, in which the primary formation of nitric acid takes place, oxidation column 10, absorption system 12, which in practice comprises several columns and oxidation compartments, and stripping column 14.

The cyclic process is represented by a zone A for the synthesis of hydroxylammonium salt with introduction of hydrogen along line 30, a zone B for the oximation reaction and oxime removal, which zone has a feed line 31 for the ketone to be converted and a discharge line 32 for the oxime. Line 20, absorption system 19, which in practice consists of several absorption columns and oxidation compartments, and lines 24 and 25 complete the recycle system for recycling reaction medium between zone A and zone B.

In absorption system 19 the reaction medium is contacted with nitrous gases supplied along line 18, the off-gas leaving the column along line 29.

The process can be carried out for example as follows: along lines 1 and 2 ammonia and air, preferably under a pressure of few atmospheres—say, 5–7 atm.—are fed to combustion vessel 3 and oxidized there with formation of NO and $H_2O$. The hot gases give off heat to the cooling pipes 5 and subsequently flow into hot-gas condenser 7 fitted wtih cooling pipes 5 which receive cooling through line 8. Having given up a large part of the water contained in them, the gases flow through line 9 into the oxidation column 10, where NO is oxidized with air to yield $NO_2$, whereupon the gases are fed back into the base of absorption system 12 along line 11.

The condensate discharged from condenser 7 via line 13 is used as absorption liquor; if the combustion of ammonia has taken place under pressure, said condensate becomes available already as nitric acid of 30–40% by weight concentration.

The acid formed in absorption system 12 flows into the top of stripping column 14, where it is stripped with secondary air supplied along line 15 for expelling dissolved NO. The nitric acid formed is carried away along line 16 and supplied, in whole or in part, to the circulating reaction medium flowing through line 24 into the zone for the synthesis of the hydroxylammonium salt.

According to the invention the nitrous gases not absorbed in system 12 flow through line 18 into absorption system 19, where they are contacted with the circulating reaction medium containing ammonium ions fed to the column top along line 20.

If not all of the $NH_4^+$ in the circulating reaction medium has to be removed as, e.g. in the event the buffer salts in the medium are already present as ammonium salts and only a small part, say 5%, of the total amount of $NH_4^+$ has to be broken down, one need not pass the whole quantity of circulating liquid through the absorption system, but it suffices to pass a part stream through it which should at least correspond to the amount to be broken down, in which latter case the remainder is passed around the system through line 21.

The ratio between the two streams, which in practice normally is taken between 5:95 and 25:75, can be adjusted by means of the valves 22 and 23. If only so little of the $NH_4^+$ in the circulating medium has to be broken down that the volume of the part stream becomes insufficient for irrigating absorption system 19, extra irrigation water for adjusting a more favourable gas-liquid ratio in absorption system 19 can be supplied through a line fitted with valve 26.

When the hydroxylamine synthesis unit is out of operation, absorption system 19 can still be used for absorbing nitrous gases provided the supply of water is continued; the dilute acid formed is then fed to absorption system 12 through line 27 with valve 28.

In fact, the absorption systems 12 and 19 together constitute an absorption system as forms part of a normal nitric acid plant. The procedure suggested in the present invention, viz. combining the breakdown of $NH_4^+$ by means of nitrous gases with the formation of nitric acid by absorption of nitrous gases in the starting solution used for synthesizing hydroxylamine on the basis of catalytic reduction of nitrate ions with molecular oxygen, has the added advantage of an improved water economy. Less water has to be evaporated because:

(a) The amount of nitric acid formed in the circulated solution would otherwise have to be supplied for example as 60% by weight $HNO_3$, while the infed water would have to be removed by evaporation, (b) An amount of water present in the circulating flow is utilized for formation of $HNO_3$ and, in consequence, need neither be evaporated.

The invention will be elucidated by means of the numerical example given below.

In a reaction medium circulated at the rate of 85,000 kg./h. and having the composition:

| | Percent by weight |
|---|---|
| $H_3PO_4$ | 11.3 |
| $NH_4NO_3$ | 17.2 |
| $NH_4H_2PO_4$ | 11.9 |
| $H_2O$ | 59.6 |

5% per hour of the $NH_4^+$ must be broken down. A part stream of 8,500 kg./h. is circulated over absorption system 19. 18,880 m.³/h. of gas having the composition

| | Percent by volume |
|---|---|
| $NO_2$ | 5.5 |
| No | 1.4 |
| $H_2O$ | 0.5 |
| $O_2$ | 0.2 |
| $N_2$ | 88.2 | are fed to the column base along line 18.

The temperature in the absorption system was maintaiend at 55° C. The liquid discharged along line 24 has the following composition:

| | Percent by weight |
|---|---|
| $H_3PO_4$ | 16.6 |
| $NH_4NO_3$ | 9.8 |
| $HNO_3$ | 27.3 |
| $H_2O$ | 46.3 |

What is claimed is:

1. In a cyclic process for the preparation of an oxime from the reaction of a ketone and a hydroxyammonium salt in which an aqueous acid reaction medium is circulated between
 a hydroxylammonium salt synthesis zone, where nitric acid is catalytically reduced with molecular hydrogen to form hydroxylamine and by-product ammonium ions, which hydroxylamine reacts with the acid of said aqueous acid reaction medium to form said hydroxylammonium salt; and an oxime synthesis zone wherein said hydroxylammonium salt is reacted with said ketone to form said oxime;
the improvement consisting essentially in providing, in combination with said cyclic process for the preparation of an oxime, a nitric acid preparation stage comprising the steps of
 combustion of ammonia thereby forming a combustion gas comprising nitrogen monoxide and nitrogen dioxide and further catalytically converting a major portion of the nitrogen monoxide to nitrogen dioxide;
 washing said gas in a washing step with water thereby forming an aqueous nitric acid solution and a washed gaseous mixture comprising nitrogen monoxide;
 washing said gaseous mixture in a second washing step with said recirculating aqueous acid reaction medium, at a temperature of between about 40° C., and about 80° C. whereby said by-product ammonium ions are removed from said aqueous acid reaction medium by reacting with said nitrogen monoxide and nitrogen dioxide in said gaseous mixture from said first washing step; and
 supplying the nitric acid solution to said aqueous reaction medium from said second washing step prior to cycling said aqueous acid reaction medium to said hydroxylammonium salt synthesis zone,
whereby said aqueous acid reaction medium is replenished in nitric acid and stripped of the by-product ammonium while circulating from the oxime synthesis zone to the hydroxylammonium salt synthesis zone.

References Cited
UNITED STATES PATENTS

| | | | |
|---|---|---|---|
| 2,797,144 | 6/1957 | Joris | 23—190 A X |
| 3,429,920 | 2/1969 | De Rooij | 23—190 X |

OSCAR R. VERTIZ, Primary Examiner

H. S. MILLER, Assistant Examiner

U.S. Cl. X.R.

23—157 R, 190 A, 220